C. T. SMALL.
SEAMING ROLL.
APPLICATION FILED FEB. 19, 1919.
1,340,842.
Patented May 18, 1920.
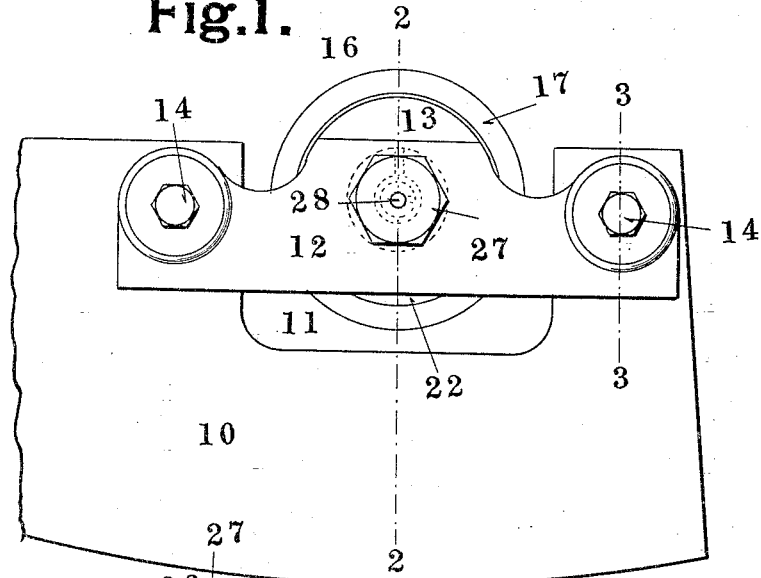
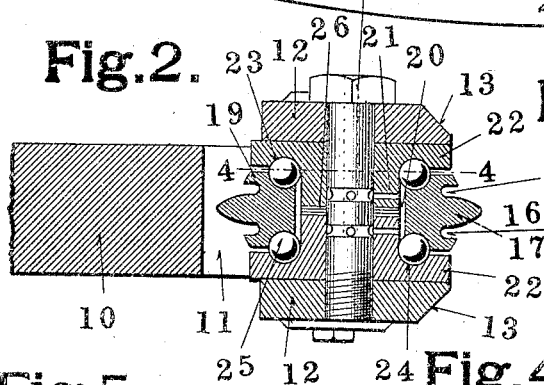
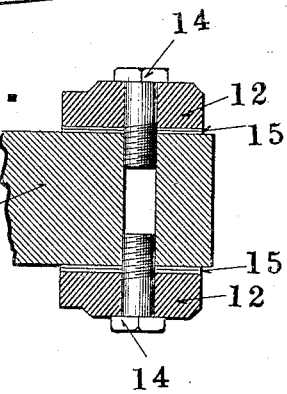
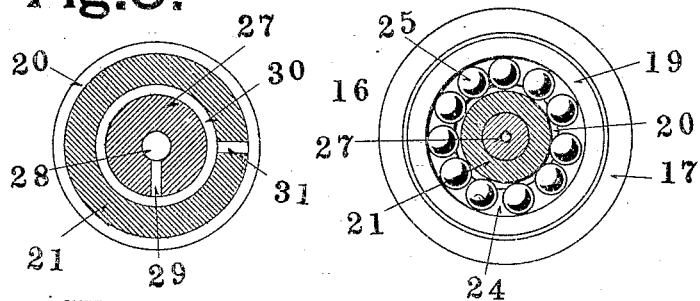
WITNESS
W. H. Alexander.
INVENTOR.
C. T. Small
BY E. E. Huffman
ATTORNEY.

UNITED STATES PATENT OFFICE.

CHESLEY T. SMALL, OF ST. LOUIS, MISSOURI.

SEAMING-ROLL.

1,340,842.  Specification of Letters Patent.  Patented May 18, 1920.

Application filed February 19, 1919. Serial No. 278,051.

*To all whom it may concern:*

Be it known that I, CHESLEY T. SMALL, a citizen of the United States of America, residing at the city of St. Louis, State of Missouri, United States of America, have invented a certain new and useful Seaming-Roll, of which the following is such a full, clear, and exact description as will enable anyone skilled in the art to which it appertains to make and use the same, reference being had to the accompanying drawings, forming part of this specification.

My invention relates to a seaming roll and is more particularly adapted for use in connection with a can sealing machine such as shown and described in my prior application Serial No. 258,587 filed October 17, 1918. It may, however, be used in various forms of can sealing machines.

In the accompanying drawings which illustrate one form of seaming roll made in accordance with my invention, Figure 1 is a top plan view, Fig. 2 is a section taken on the line 2—2 of Fig. 1, Fig. 3 is a section taken on the line 3—3 of Fig. 1, and Fig. 4 is a section taken on the line 4—4 of Fig. 2, and Fig. 5 is an enlarged section illustrating the manner of oiling the roll.

10 indicates a supporting member which may be the shuttle block shown and described in my prior application above referred to This carrying member 10 is provided with a recess 11, bridged by a pair of plates 12, each of which is preferably provided with a projecting beveled portion 13. The plates 12 are held in position against the sides of the carrying member 10 by means of screws 14. Arranged between one or both of the plates 12 and the carrying member 10 are a number of shims 15. Carried between the plates 12 in the recess 11 is a seaming roll 16. This seaming roll 16 is provided with a central wedge shaped portion 17 at each side of which is an annular recess 18 so that the said seaming roll is reversible. The forming of the annular recesses 18 in the periphery of the seaming roll 16 provides a pair of flanges 19 each of which is preferably slightly beveled. The seaming roll 16 is provided with a central aperture 20 to receive a central support. This central support is composed of two parts 21 each of which is provided with a body portion adapted to project partially through the opening 20 and with a flange 22 overlapping the flange 19 of the seaming roll 16. Formed at the junction of the body of the member 21 and the flange 22 is a ball race 23 coöperating with a corresponding ball race 24 formed in the seaming roll 16. Between each pair of ball races 23 and 24 is a set of antifriction balls 25. Arranged between the two parts of the central supporting member 21 are a number of shims 26 corresponding in thickness with the shims 15 hereinbefore referred to. The two parts 21 of the central support are held in position by means of a bolt 27 passing through the upper plate 12 and threaded into the corresponding lower plate as shown in Fig. 2 of the drawings. Formed in the center of the bolt 27 is an oil hole 28 communicating by passages 29 with annular grooves 30 in the periphery of the bolt which grooves communicate by means of passages 31 with the central opening 20 of the seaming roll and consequently supply oil to the balls 24.

The construction of my device is such that the seaming roll 16 is firmly held against both lateral and longitudinal movement and at the same time effective antifriction bearings are provided. As practically all the wear on the central supports occurs at one point the wear may be taken up by partially rotating the central supports to bring an unworn portion of the support into position to receive the wear. After all sides of the ball races have been worn, one of the plates 12 may be removed so as to allow the removal of one or more of the shims 15 and a corresponding number of the shims 26. In this manner the wear is taken up and at the same time there is no chance of the parts running loose as would be the case if threaded means were provided for taking up the wear of the parts. Owing to the form of the seaming roll, it may be readily reversed or it may be used without reversing for seaming either the top or bottom of the can.

Having fully described my invention, what I claim as new and desire to secure by Letters Patent of the United States is:

1. The combination with a recessed carrying member, of a pair of plates secured to said member and bridging the recess therein, a seaming roll provided with a central aperture, a central support carried by said plates and extending through the aperture in the seaming roll, and antifriction bearings interposed between said roll and said central support.

2. The combination with a recessed carrying member, of a pair of plates secured to said member and bridging the recess therein, a reversible seaming roll provided with a central aperture, a central support carried by said plates and extending through the aperture in the seaming roll, and antifriction bearings arranged between said roll and said central support to receive both side and end thrust.

3. The combination with a recessed carrying member, of a seaming roll having a central aperture, a two part central support extending through the aperture of said roll, each part of said support being provided with an overlapping flange, and antifriction balls arranged between each of said flanges and the seaming roll.

4. The combination with a recessed carrying member, of a pair of plates secured to said member and bridging the recess therein, a two part central support extending through the aperture in said seaming roll, each of the parts of said support being provided with an overlapping flange, means for securing said supports between said plates, and antifriction balls arranged between each of said flanges and the seaming roll.

5. The combination with a supporting member, of a seaming roll having a central aperture, a two part central support extending through the aperture in said roll, each part of said support being provided with an overlapping flange, antifriction balls arranged between each of said flanges and the seaming roll, and means for adjusting the parts of said support toward and away from each other.

6. The combination with a recessed carrying member, of a pair of plates secured to said carrying member and bridging the recess therein, a two part central support extending through the aperture of said seaming roll, each part of said support being provided with an overlapping flange, means for securing said support between said plates, antifriction balls arranged between each of said flanges and the seaming rolls, and means for adjusting the parts of said central support toward and away from each other.

7. The combination with a carrying member, of a seaming roll having a central aperture, a two part central support extending through the aperture of said seaming roll, shims arranged between the two parts of said support for adjusting the parts of the support toward and away from each other, each part of said support being provided with an overlapping flange, and antifriction balls arranged between each of said flanges and the seaming roll.

8. The combination with a recessed carrying member, of a pair of plates secured to said carrying member and bridging the recess therein, shims interposed between one of said plates and the carrying member for adjusting the distance between said plates, a seaming roll provided with a central aperture, a two part central support extending through the aperture in said seaming roll, shims arranged between the parts of said support for adjusting the parts toward and away from each other, each part of said support being provided with an overlapping flange, and antifriction balls arranged between each of said flanges and the seaming roll.

9. The combination with a recessed carrying member, of a pair of plates secured to said member and bridging the recess therein, shims interposed between one of said plates and the carrying member for adjusting the distance between said plates, a reversible seaming roll provided with a central aperture, a two part central support extending through the aperture in said seaming roll, shims arranged between the parts of said support for adjusting the parts toward and away from each other, each part of said support being provided with an overlapping flange, and antifriction balls arranged between each of said flanges and the seaming roll.

10. The combination with a carrying member, of a seaming roll having a central aperture, a two part central support extending through the aperture of said seaming roll, each part of said support being provided with an overlapping flange, anti-friction balls arranged between said flanges and the seaming roll, a member provided with an oil passage and extending through said central support to secure it to the carrying member, and oil passages leading from said first named oil passage to the space between the seaming roll and central support.

In testimony whereof, I have hereunto set my hand and affixed my seal.

CHESLEY T. SMALL. [L. S.]